United States Patent [19]

Hunt

[11] 4,396,277

[45] Aug. 2, 1983

[54] PROCESS FOR SAVING FILM IN PHOTOTYPE SETTERS

[76] Inventor: Norman T. Hunt, 7 Alderbrook Rd., Andover, Mass. 01810

[21] Appl. No.: 207,353

[22] Filed: Nov. 17, 1980

[51] Int. Cl.[3] .............................................. G03B 17/22

[52] U.S. Cl. ........................................ 355/29; 355/77; 354/5; 354/211

[58] Field of Search ........................ 355/28, 29, 27, 77; 354/5, 7, 90, 92, 93, 211

[56] References Cited

U.S. PATENT DOCUMENTS

| | | | |
|---|---|---|---|
| 3,557,675 | 1/1971 | Koll et al. | 355/28 |
| 3,689,150 | 9/1972 | Northmann et al. | 354/211 |
| 3,987,465 | 10/1976 | Sippel | 355/27 |
| 4,076,411 | 2/1978 | Crayton et al. | 355/28 |
| 4,223,994 | 9/1980 | Stanton et al. | 355/28 |
| 4,260,234 | 4/1981 | Burton | 355/28 |

*Primary Examiner*—Alan Mathews
*Attorney, Agent, or Firm*—Donald W. Meeker

[57] ABSTRACT

After exposing one galley on a continuous strip of film, advance a length of blank film equal to the minimum length required for handling the film. Then begin to expose a second galley on the film. After the first galley has advanced into a cassette and the blank film is adjacent to the cutting blade, interrupt the exposing of the second galley to stop the film advance. Cut through the blank film, remove the cassette containing the first galley, and replace it with an empty cassette to receive the second galley. Reactivate exposure of the second galley. The process may be repeated between any galleys thereafter and between series of closely-spaced galleys exposed on the same strip of film. Advances of the film must be monitored for required distances and signals may be given between steps in the process.

10 Claims, 4 Drawing Figures

PROCESS FOR SAVING FILM IN PHOTOTYPE SETTERS

BACKGROUND OF THE INVENTION

1. Technical Field

My invention relates to a process adapted for or intended for use with a photographic device, and in particular having means for cutting a portion of light setsitive material from a strip.

2. Background Art

At present, phototype setters waste a substantial amount of film in units which do not incorporate a developer in combination with the phototype setter and in some units which do incorporate a developer in combination with the phototype setter.

In phototype setters without built-in developers the film must be cut after exposure and removed from the phototype setters in light-tight cassettes to be transferred to a developer for processing. Normally, after exposure of a galley on the film, that exposed galley is run into the cassette, the film is cut, and the cassette containing the galley is removed and replaced by an empty cassette. Naturally, a small amount of blank film must be left outside of the cassette to allow for handling the film when inserting the cassette in the developer; the amount of film between the cassette and the cutting blade. But, in order to advance the exposed galley of film completely out of the phototype setter and into the cassette, a substantial amount of blank film is advanced, equal to the distance from the cutting blade back down to the exposure point where the exposure of the next galley is begun. This blank film is wasted.

Even if several galleys are exposed on a single strip of film before it is cut, the size of the cassette limits the amount of film that may be run into the cassette at one time and a substantial amount of film is wasted between cassettes because of the blank film run out before cutting the film between cassettes.

In photographic devices having built-in developers, a great deal of film is wasted in units which operate exposing components and developing components at different speeds for the same roll of film. If the developer operates at a faster rate than the exposer, extra blank film must be advanced into the developer to prevent tearing the film and interrupting the process, thereby wasting the blank film.

DISCLOSURE OF INVENTION

The present invention provides a process for saving film in a phototype setter by not leaving unnecessary amounts of film blank.

The present invention provides a method of advancing, monitoring, stopping and cutting the film in a phototype setter so that only the minimum amount of film necessary for handling the film is wasted.

The present invention provides a process whereby the film in a phototype setter is advanced only a minimum amount between galleys.

The present invention further provides a process in a phototype setter whereby a galley is begun to be exposed before the preceding galley is run out of the phototype setter into the cassette and cut.

The present invention further provides an economical means of operating a phototype setter.

BRIEF DESCRIPTION OF THE DRAWINGS

These and other details and advantages of my invention will be described in connection with the accompanying drawings in which.

BEST MODE FOR CARRYING OUT THE INVENTION

Figure 1:
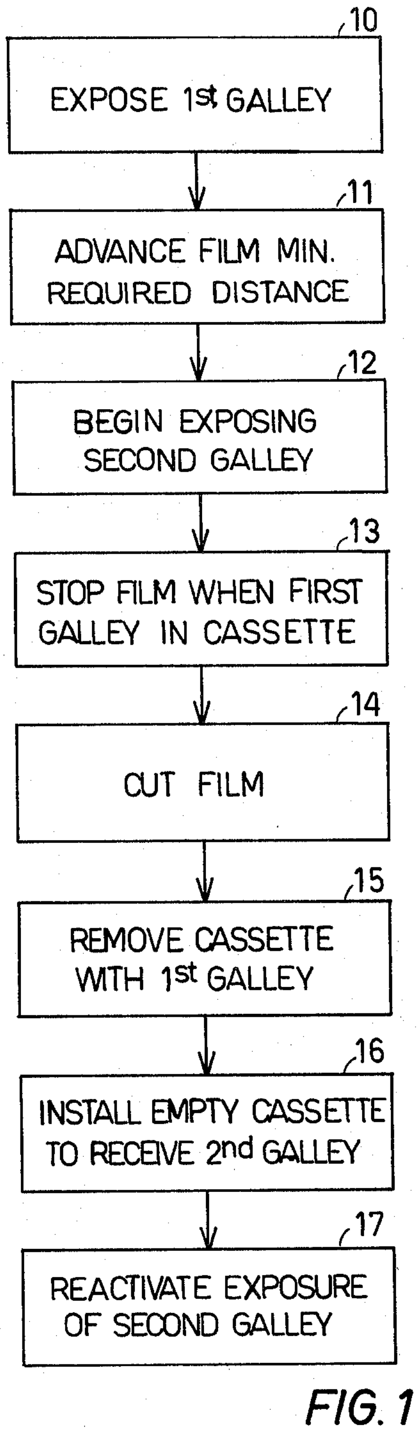
FIG. 1 is a diagrammatic illustration of the process of the invention presented as a series of basic steps.
Figure 2:
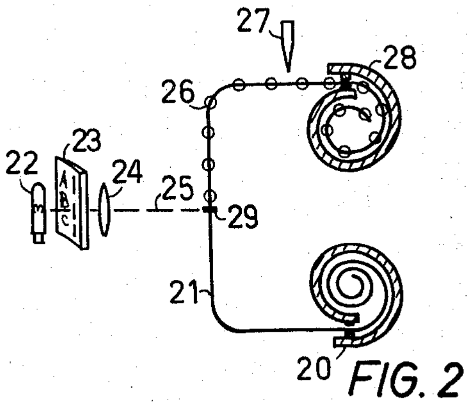
FIG. 2 is a diagrammatic view of the film track of the phototype setter after exposure of the first galley is complete (after the first step of the process indicated in box 10 of FIG. 1)
Figure 3:
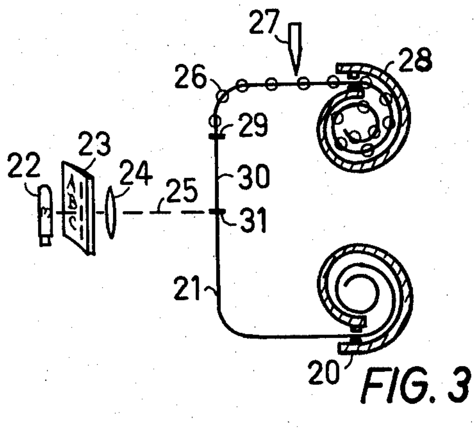
FIG. 3 is a diagrammatic view of the film track of the phototype setter after advancing the film the minimum distance required for handling the film (after the second step of the process indicated in box 11 of FIG. 1)
Figure 4:
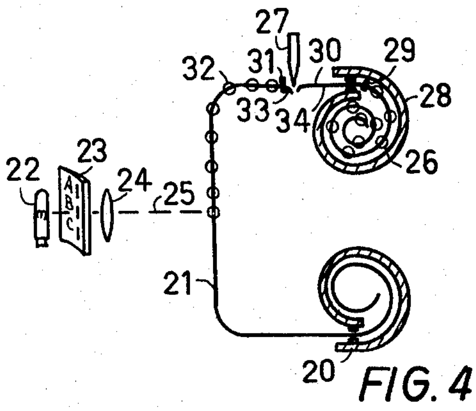
FIG. 4 is a diagrammatic view of the film track of the phototype setter after exposure of the second galley has begun, the first galley is within the take-up cassette, and the film has been cut (after the fifth step in the process indicated in box 14 of FIG. 1).

In FIG. 1, eight basic steps of the process of the invention are diagrammed sequentially beginning at the top. To illustrate the physical state of the phototype setter, FIGS. 2, 3 and 4 show the position of the film advancement after various steps in the process. In all three figures a standard phototype setter is symbolized by a source of light 22 flashing through a film template or font 23 and through a lens system 24 to expose characters via an exposure beam 25, shown as a broken line, onto the blank film 21 which is advanced from a feed cassette 20, on the bottom shown in section, upward into a take-up cassette 28, on the top shown in section.

The first step, listed in box 10 of FIG. 1, is to expose on the film, in a manner familiar to the art, a galley, herein called the first galley, which may be one galley or a series of closely-spaced galleys. In FIG. 2, the exposed first galley 26, shown with circles along its length, extends from the end 29 of the first galley, shown with a transverse dash, adjacent to the exposure beam 25 past the cutting blade 27 and into the take-up cassette 28. FIG. 2 represents the position of the film after the first step.

After exposing the first galley, the next step of the process, listed in box 11 of FIG. 1, is advancing the film a minimum required distance. The position of the film after the second step is represented in FIG. 3, wherein the film has been advanced so that the minimum required distance 30 of blank film is allowed between the end 29 of the first galley and the beginning 31 of the second galley, shown with a transverse dash, aligned with the exposure beam 25.

In FIG. 4, the minimum required distance 30 is shown severed into two components at the point where the cutting blade severs the film: an insertion portion 34 and a handling portion 33. Extending from the end 29 of the first galley 26, the insertion portion 34 of blank film, just sufficient in length for insertion into a developing device, must be allowed to protrude from the take-up cassette 28 to extract the film from the cassette. In addition, a very small handling portion 33 of blank film, just sufficient in length for handling the film and acting as a safety margin, extends from the beginning 31 of the second galley 32, shown with circles along its length.

The film must be monitored to determine how much film to advance and when to stop the advance after the film has moved the minimum required distance. A signal may then be given to begin the next step.

After advancing the minimum required distance of blank film, the third step, shown in box 12 of FIG. 1, is to begin exposing on the film, in a manner familiar to the art, another galley, herein called the second galley, which may be one galley or a series of closely-spaced galleys. During exposure of the second galley, because of requirements to reverse lead, thereby reversing the movement of the film, said film may be advanced to any point in the galley and then reversed to a point at or near the beginning of the second galley.

When the final advance of the film is made during exposure of the second galley, after the first galley has been completely advanced into the take-up cassette, the film is stopped, as listed in box 13 of FIG. 1, by interrupting but not shutting down the program controlling the phototype setter. The first galley must be within the cassette sufficiently far to prevent any light from striking the exposed galley, thereby leaving the insertion portion 34 of blank film extending between the end 29 of the first galley and the cutting blade 27, as seen in FIG. 4. Monitoring the film advance determines when to stop the film, and a signal may then be given to proceed with the next step.

The film is then cut, as listed in box 14 of FIG. 1, by the cutting blade 27 of FIG. 4, which is the figure illustrating the position of the film after the cutting step of box 14. The cutting may be performed manually or automatically depending upon the type of phototype setter to which the process is applied. A signal to the operator to cut the film is necessary for a phototype setter with automatic controls and a manual cutting blade.

The sixth step, listed in box 15 of FIG. 1, is to remove the take-up cassette containing the first galley now severed from the strip of film. The cassette may then be placed in a developer to process the first galley.

The next step, listed in box 16 of FIG. 1, is to replace the take-up cassette, which was removed, by an empty cassette installed in the phototype setter to receive the second galley.

After the empty cassette is in place on the phototype setter, the final step, listed in box 17 of FIG. 1, is to reactivate the exposure of the second galley, thereby continuing the exposure program advancing the second galley into the newly installed cassette.

The process of saving film may then be repeated for the second and third galleys in a similar manner to the process for the first and second galleys. A number of closely-spaced galleys may be exposed without cutting between galleys until the capacity of the take-up cassette has been reached. The film-saving process may then be applied between cassettes, wherein the cassettes contain either single galleys or series of closely-spaced galleys.

Although described herein for a phototype setter, this process may be applied in a similar manner to any photographic device employing a continuous strip of film and a means of cutting the film.

It is understood that the preceding description is given merely by way of illustration and that various modifications may be made thereto without departing from the spirit of the invention as claimed.

I claim:

1. A process for saving film in a photographic device employing a continuous strip of film and a cutting blade, wherein the steps of the process comprise:

completing exposure of a first portion of film;
advancing blank film;
beginning to expose a second portion of film;
interrupting exposure of the second portion of film to stop the film when the blank film is adjacent to the cutting blade;
cutting through the blank film; and
reactivating exposure of the second portion of film.

2. The process of claim 1 wherein the photographic device is a phototype setter.

3. The process of claims 1 or 2 wherein the blank film is a minimum length required for handling the film.

4. The process of claims 1 or 2 wherein the film advancement is monitored.

5. The process of claims 1 or 2 wherein signals indicate the completion of steps in the process.

6. The process of claims 1 or 2 wherein the first exposed portion of film is advanced into a first cassette, which is removed from the photographic device after cutting the film, and which first cassette is replaced by an empty cassette to receive the second portion of exposed film.

7. A process for saving film in a phototype setter provided with a continuous strip of film and a cutting blade, wherein the steps of the process comprise:

exposing a first galley on the strip of film;
advancing a length of blank film equal to a minimum length required for handling the film;
beginning to expose a second galley on the strip of film;
interrupting the exposure of the second galley to stop the film advance after the first galley is inside a cassette and the blank film is adjacent to the cutting blade;
cutting through the blank film between the first and second galleys;
removing the cassette containing the first galley;
replacing the cassette containing the first galley with an empty cassette to receive the second galley; and
reactivating exposure of the second galley.

8. The process of claim 7 wherein film advances are monitored.

9. The process of claims 7 or 8 wherein signals indicate the completion of steps in the process.

10. The process of claims 7 or 8 wherein a galley comprises a series of closely-spaced galleys.

* * * * *